Figure 1:
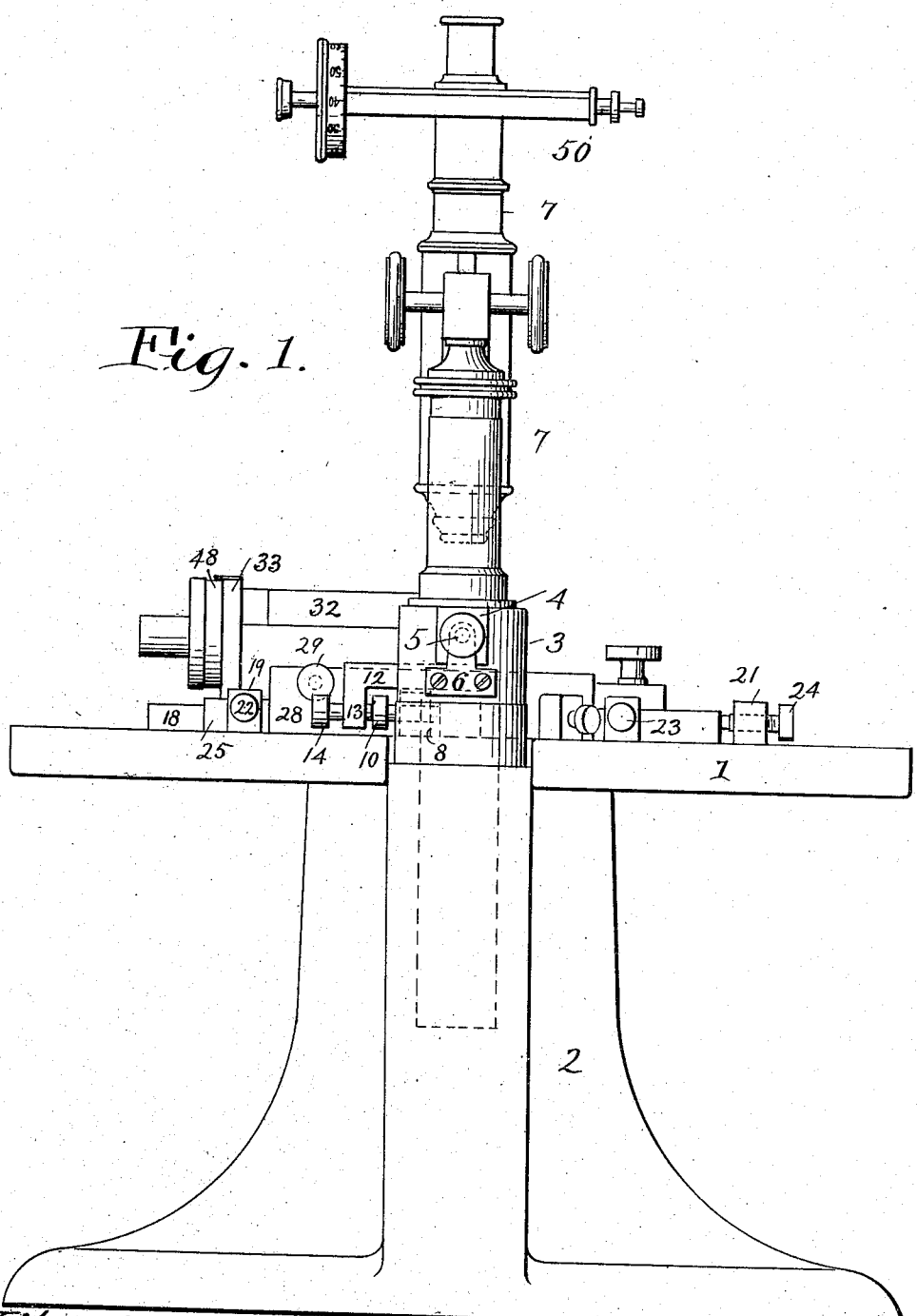

H. A. REYNOLDS.
MICROSCOPE GAGE FOR FINE MEASUREMENTS.
APPLICATION FILED JAN. 16, 1907.

936,667.

Patented Oct. 12, 1909.
4 SHEETS—SHEET 1.

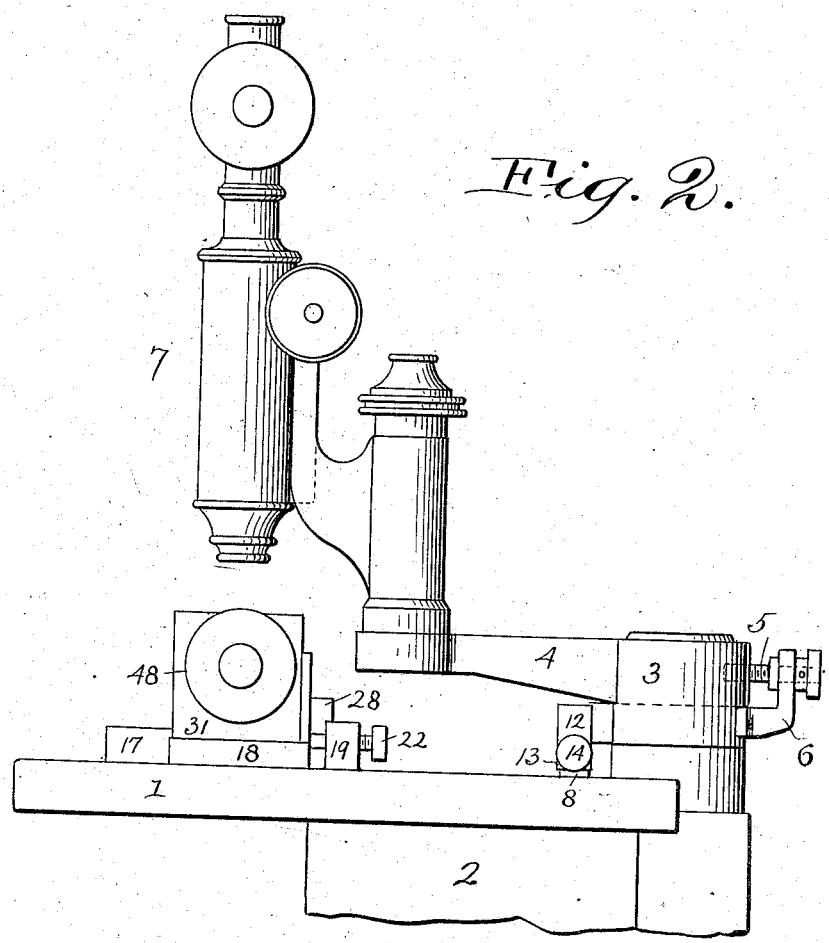

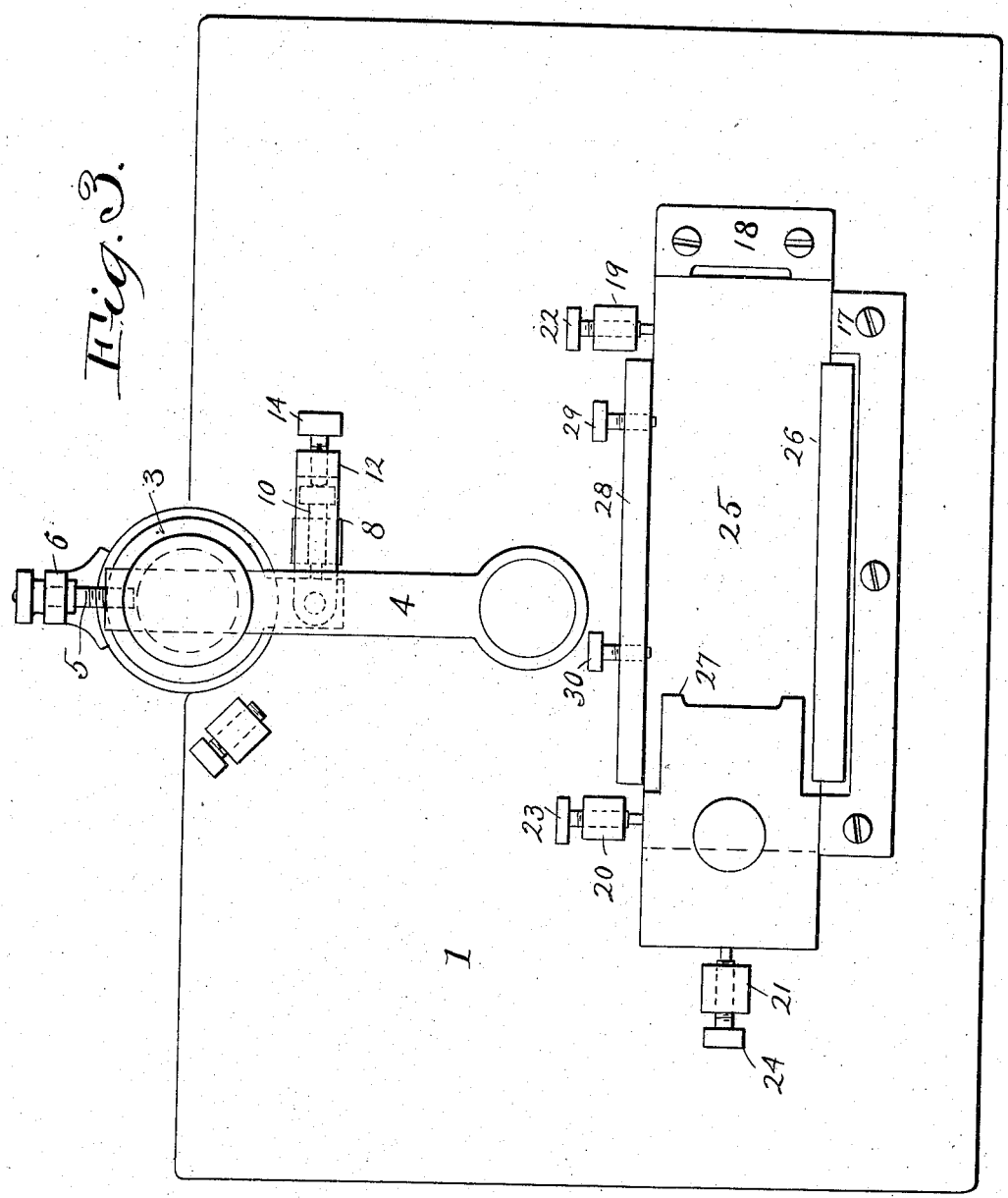

H. A. REYNOLDS.
MICROSCOPE GAGE FOR FINE MEASUREMENTS.
APPLICATION FILED JAN. 16, 1907.
936,667.
Patented Oct. 12, 1909.
4 SHEETS—SHEET 4.
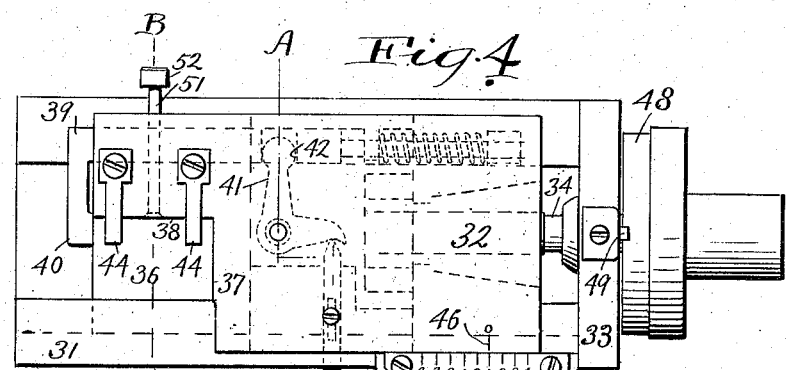
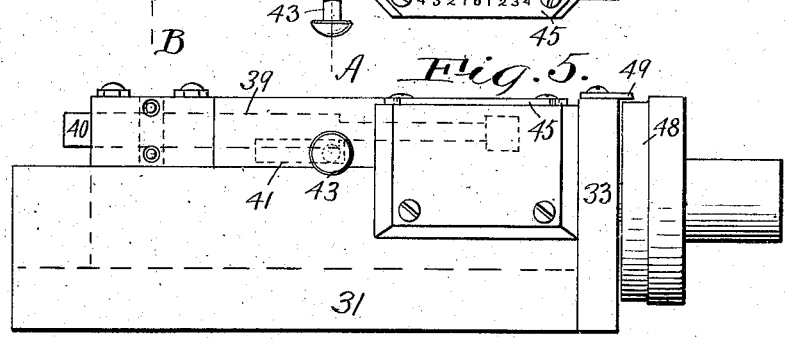
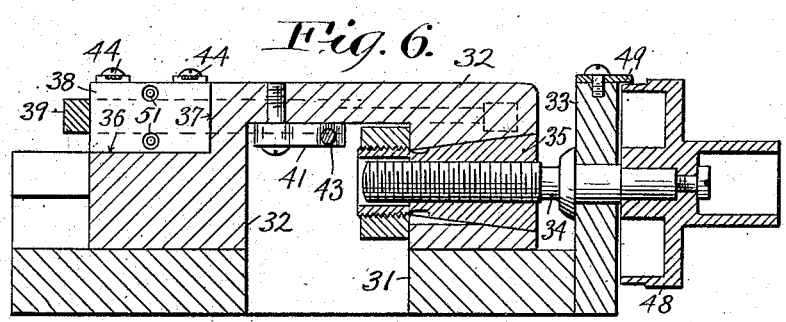
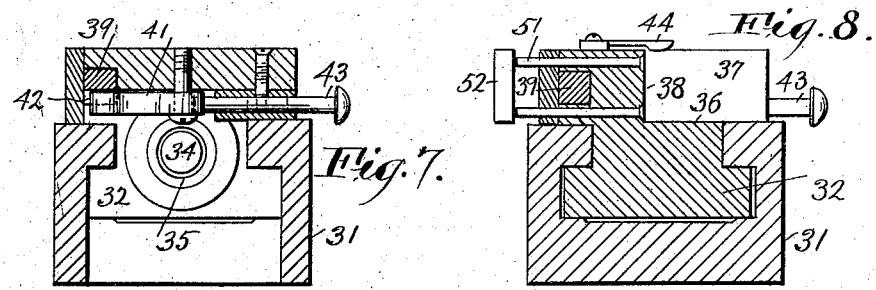
Witnesses.
E. B. Gilchrist.
H. R. Sullivan
Inventor
Horace A. Reynolds
By Thurston & Woodward
Attorneys

UNITED STATES PATENT OFFICE.

HORACE A. REYNOLDS, OF WOONSOCKET, RHODE ISLAND, ASSIGNOR TO ELECTRIC COMPOSITOR COMPANY, OF NEW YORK, N. Y., A CORPORATION OF NEW JERSEY.

MICROSCOPE-GAGE FOR FINE MEASUREMENTS.

936,667.  Specification of Letters Patent.  Patented Oct. 12, 1909.

Application filed January 16, 1907. Serial No. 352,618.

*To all whom it may concern:*

Be it known that I, HORACE A. REYNOLDS, residing at Woonsocket, in the county of Providence and State of Rhode Island, have invented a certain new and useful Improvement in Microscope-Gages for Fine Measurements, of which the following is a full, clear, and exact description.

In manufacturing matrices for linotype machines, it is necessary that the character depressions in the edges thereof be very exactly placed. In fact, the exactness with which these depressions must be placed is so great that to determine whether they are properly placed requires the use of a microscope. It has been the custom heretofore, when one is to examine a matrix, to determine whether a character depression therein is properly placed, to file the edge of the matrix away down almost to the bottom of the depression, before subjecting the matrix to the microscope examination in connection with a suitable gage.

The present invention is a microscope gage by which one may, without filing a matrix away, detect inaccuracies as small as one ten thousandth of an inch. It will be understood that the primary object of testing a matrix is to enable the operation of a machine, in which the depressions are being made, to readjust said machine as required to enable it to put such depressions in exactly the proper location.

The invention, as embodied in practical mechanism, is shown in the accompanying drawings, wherein—

Figure 1 is a rear elevation of said machine. Fig. 2 is a side view thereof. Fig. 3 is a plan view when the microscope has been removed from its supporting arm and when the micrometer gage has been removed from its supporting shoe. Fig. 4 is a plan view, full size, of a micrometer gage suitable for use as a part of the described mechanism. Fig. 5 is a side elevation of said gage. Fig. 6 is a central longitudinal section thereof. Fig. 7 is a vertical sectional view in the line A—A on Fig. 4; and Fig. 8 is a vertical sectional view in the plane of line B—B on Fig. 4.

The following is the description in detail of the mechanism shown in said drawings.

1 represents the microscope stage. 2 represents the standard upon which it is supported.

3 represents a vertical spindle mounted in suitable bearings at the rear end of the stage, but projecting a suitable distance above it.

4 represents an arm which is nicely fitted to and is slidable horizontally through a recess in the spindle 3. 5 represents an adjustment screw which screws into the rear end of said arm. 6 represents a bracket fixed to the spindle, in which this screw 5 is mounted, but in which it has no endwise movement. By turning this screw the arm 4 is moved endwise in the spindle.

7 represents a microscope of any suitable construction which is fixed to the front end of the arm 4.

8 represents a lug fast to the microscope stage, and 10 represents a set screw which screws horizontally through this lug.

12 represents an arm which is pivoted to the under side of the arm 4 on a vertical pivot. 13 is a downwardly extended flange on arm 12; and 14 is a set screw which screws through the same. When the microscope is in use, this arm is swung into position shown in Fig. 3, and the set screw 10 is screwed against the head of the adjustment screw 14, thereby rigidly fastening the arm 4 and the microscope carried thereby in the desired position for use.

17 and 18 represent blocks fixed to the microscope stage so that their inner faces are vertical and stand exactly at right angles to each other.

19 and 20 represent lugs fixed to the microscope stage opposite the block 17; and 21 represents a lug fixed to said stage opposite the block 18. Set screws 22, 23 and 24 severally screw through these lugs 19, 20 and 21 toward the blocks 17 and 18 respectively.

25 represents a gage shoe which is adapted to rest upon the microscope stage and to have its side and end pressed respectively against the blocks 17 and 18 by the set screws 22, 23 and 24.

26 represents a vertical shoulder on the front edge of the shoe 25; and 27 represents a vertical shoulder on the shoe near one end thereof. 28 represents a flange secured to the rear side of said shoe, and 29 and 30 represent set screws screwing through the same toward the flange 26. 31 represents the base of the gage which is to be placed upon said shoe, with its end against shoulder 27, and its side against shoulder 26, being so held by set screws 29 and 30.

32 represents a slide nicely fitted in a longitudinal guide-way in the base 31.

33 represents a flange fixed to one end of the base block 31.

34 is a micrometer screw rotatably mounted in the flange 33, but cannot move endwise in its bearings.

35 represents a take-up block adjustably secured in the gage slide 32, and into which the micrometer screw is screwed. By turning the micrometer screw the slide 32 may be moved as required.

36 represents a horizontal seat formed upon the slide 32 near one end thereof, and 37 and 38 represent respectively vertical shoulders located at right angles to each other adjacent to said seat. This seat is to receive a matrix which is to be tested; and the matrix resting upon its edge upon said seat is to be held firmly against the shoulders 37 and 38.

39 represents a spring-actuated slide mounted in a slide 32, and 40 represents clamping arm which is a part thereof and extends to a position where it may be drawn by its spring against a matrix resting upon the seat 36 and press it firmly against the shoulder 37.

41 represents a bell crank lever pivoted to the slide 32, and 42 represents a notch in the slide 40 into which one arm of this bell crank lever projects.

43 represents a push rod which is movably mounted in the slide 32 with its inner end engaging with one arm of the lever 41, and with its other end projecting out from slide 32. By pressing this push rod inward the lever 41 is rocked, and it so moves slide 39 in opposition to its spring that a matrix being clamped thereby may be released.

44 represents two spring arms secured to the top of slide 32 overhanging the seat 36 and adapted to press a matrix down upon the seat.

51 represents two pins which are movable through the upper part of the slide through that vertical wall 38 against which the matrix is held when being tested. The rear ends of these pins are connected by a bar 52 by means of which they may be both pushed forward, with the result of pushing a matrix, which is resting upon the seat, from beneath the spring arm 44, whereby said matrix may be easily removed.

45 represents a graduated plate secured to the side of the base block 31 in the plane substantially of the top of the slide 32. 46 represents a graduation mark upon said slide 32 adapted to be read in connection with the graduations upon this graduated plate.

48 represents a cylindrical flange secured to the micrometer screw, and having its surface graduated; and 49 represents a graduated finger secured to the top of flange 31 and overhanging the graduated surface of this flange 48.

Returning now to the microscope, 50 represents a filar attachment of the usual form, that is to say, containing the usual cross hairs,—this device being so familiar an attachment for microscopes that it need not be here described at any greater length.

In using the described device, a standard matrix, that is to say a matrix in which the character depression is accurately placed, is first put upon the seat 36 under the springs 44 and is clamped in place by the spring-actuated arm 46. The microscope and the gage are then properly adjusted,—the adjustment of the microscope requiring that the vertical hair shall be projected down upon the extreme edge of the matrix depression, which projecting of the horizontal hair connects with the bottom line of said depression; at which time the graduations should read as required. This standard matrix is then removed and a matrix to be tested is put in its place. By turning the micrometer screw, if necessary, the vertical cross hair will be brought into alinement with the extreme edge of the matrix depression, and the operator may then read the gage and determine whether or not the depression is correctly placed, and if it is not may determine how far it is away from the required position.

The micrometer gage shown in Figs. 4 to 8 inclusive is especially contrived for use in determining whether the character depressions are placed at exactly the proper distance from the ends of the matrix. This micrometer gage is made separably from the shoe, which is secured, when in use, so that said gage may, when required, be removed and another gage, especially contrived for measuring the position of the character depressions in reference to the sides of the matrix, may be substituted and screwed in said shoe. The only difference between the micrometer gage shown and such a gage as would be required for measuring the character depressions in reference to the sides of the matrix is a slight change in the position of the shoulders 37 and 38 with respect to the seat 36 and the presser arm 40.

By reference to the drawings, it will be seen that on the microscope stage there is a lug 8, on which is an adjustment screw 10. The purpose of this lug and adjustment screw is to enable the accurate positioning of the microscope with respect to some other part of the microscope stage, so that the microscope and its stage may be utilized for other purposes than those for which it is primarily contrived.

Having described my invention, I claim:

1. The combination of a microscope stage, a microscope located above said stage, a horizontal arm to which the microscope is secured, means for adjusting said arm lengthwise and about a vertical axis, a micrometer gage supported upon said stage, means carried by the stage for accurately fixing the position of said gage, said gage including a slide which has a seat for a matrix to be tested and shoulders against which said matrix is to be held, a micrometer screw for moving said slide, and indicating mechanism showing the resultant displacement of said slide.

2. The combination of a vertical spindle, a horizontal microscope stage, an arm extending over said stage and slidable horizontally in said spindle, means for adjusting said arm backward and forward to a required position, a microscope supported upon said arm, a micrometer gage supported upon said stage, said stage being provided with shoulders with which the micrometer gage will engage when properly located, a slide forming a part of said micrometer gage having a seat and shoulders to support and engage with the matrix, a micrometer screw for moving said slide, and indicating mechanism to show the extent of displacement of said slide.

3. The combination of a vertical spindle, a horizontal microscope stage, an arm extending from said stage, and slidable horizontally in said spindle, means for adjusting said arm backward and forward to a required position, a microscope supported upon said arm, a micrometer gage movably supported upon said stage, said stage being provided with shoulders with which the micrometer gage will engage when properly located, a lug fixed to said micrometer stage, an arm rigid with said spindle, a set screw in said lug, a bar pivoted by a vertical pivot to the under side of the last named arm, a downwardly turned flange on said pivoted bar, and a set screw passing through said flange.

4. The combination of a microscope stage having thereon means for exactly fixing the position of a micrometer gage supported upon said stage, with a micrometer gage which includes a base, a slide movable thereon having a seat for a matrix and shoulders against which the matrix is to be held while resting upon said seat, a micrometer screw for moving said slide relative to the base.

5. The combination of a microscope stage, a microscope adjustably supported thereover, having a filar attachment, a micrometer gage consisting of a base which is supported upon said stage, means carried by the stage for definitely determining the position of said gage base, a slide mounted upon the gage base and having a seat and two shoulders for the support and engagement of said matrix, a micrometer screw for moving the slide relative to the base, and indicating mechanism showing the displacement of said slide relative to the base.

6. The combination of a base, a slide movable thereon, a micrometer screw for moving the same, indicating mechanism showing the displacement of said slide upon said base, said slide being provided with a seat and two shoulders for the support and engagement of a matrix, a spring-actuated slide having a pressure arm for engagement with a matrix upon said seat.

7. The combination of a base, a slide movable thereon, a micrometer screw for moving the same, indicating mechanism showing the displacement of said slide upon said base, said slide being provided with a seat and two shoulders for the support and engagement of a matrix, a spring-actuated slide having a pressure arm for engagement with a matrix upon said seat, two springs for engagement with a matrix upon said seat.

8. The combination of a base, a slide movable thereon, a micrometer screw for moving the same, indicating mechanism showing the displacement of said slide upon said base, said slide being provided with a seat and two shoulders for the support and engagement of a matrix, a spring-actuated slide having a pressure arm for engagement with a matrix upon said seat, a bell crank lever mounted upon the slide having one arm engaging the spring slide, a push rod mounted in the gage slide engaging with the other arm of said bell crank lever.

9. The combination of a microscope stage, a microscope adjustably supported thereover, a shoe secured upon said stage and having shoulders at one side and one end respectively, means carried by the microscope stage for definitely fixing the position of the shoe thereon, a micrometer gage comprising a base adapted to rest upon said shoe in contact with said shoulders, a slide mounted upon the gage base having a seat and two shoulders for the support and engagement of a matrix, a micrometer screw for moving the slide relative to the base, and indicating mechanism showing the displacement of said slide relative to the base.

In testimony whereof, I hereunto affix my signature in the presence of two witnesses.

HORACE A. REYNOLDS.

Witnesses:
G. L. HAMMOND,
T. L. CLARK.